(12) United States Patent
Abd Elhamid et al.

(10) Patent No.: US 8,563,075 B2
(45) Date of Patent: Oct. 22, 2013

(54) REMOVAL OF NON-CONDUCTIVE HYDROPHILIC COATINGS FROM LANDS OF FUEL CELL BIPOLAR PLATES

(75) Inventors: Mahmoud H. Abd Elhamid, Grosse Pointe Woods, MI (US); Richard H. Blunk, Macomb Township, MI (US); Daniel J. Lisi, Eastpointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1486 days.

(21) Appl. No.: 11/696,361

(22) Filed: Apr. 4, 2007

(65) Prior Publication Data

US 2008/0248370 A1 Oct. 9, 2008

(51) Int. Cl.
*B05D 5/12* (2006.01)

(52) U.S. Cl.
USPC .......................... 427/115; 427/355

(58) Field of Classification Search
USPC .................................. 427/355, 115
See application file for complete search history.

(56) References Cited

U.S. PATENT DOCUMENTS

| | | | |
|---|---|---|---|
| 5,344,724 A * | 9/1994 | Ozaki et al. ............ | 429/94 |
| 6,056,903 A * | 5/2000 | Greenwood et al. ....... | 264/41 |
| 2001/0026782 A1* | 10/2001 | Wang et al. ............ | 422/211 |
| 2003/0118888 A1* | 6/2003 | Allen ................... | 429/34 |
| 2003/0135942 A1* | 7/2003 | Bastien ................. | 15/121 |
| 2003/0236362 A1* | 12/2003 | Bluem et al. ........... | 525/530 |
| 2004/0071927 A1* | 4/2004 | Murphy et al. .......... | 428/95 |
| 2004/0237833 A1 | 12/2004 | Sepeur et al. | |
| 2005/0181264 A1* | 8/2005 | Gu et al. ............... | 429/38 |
| 2005/0212869 A1* | 9/2005 | Ellson et al. ........... | 347/75 |
| 2005/0260909 A1* | 11/2005 | Hirahara ............... | 442/179 |
| 2007/0031721 A1 | 2/2007 | Winter et al. | |
| 2007/0036891 A1 | 2/2007 | Peters et al. | |
| 2007/0037036 A1 | 2/2007 | Winter et al. | |

FOREIGN PATENT DOCUMENTS

| | | |
|---|---|---|
| DE | 102006025124 A1 | 12/2006 |
| DE | 102006043279 A1 | 3/2007 |
| WO | WO 2006/124124 A2 | 11/2006 |
| WO | WO 2007/021679 A2 | 2/2007 |

* cited by examiner

*Primary Examiner* — Michael Cleveland
*Assistant Examiner* — Austin Murata
(74) *Attorney, Agent, or Firm* — Fraser Clemens Martin & Miller LLC; J. Douglas Miller

(57) ABSTRACT

A bipolar plate for a fuel cell is provided including a plate having an active surface with a plurality of flow channels formed therein. The plurality of flow channels have a hydrophilic coating deposited thereon and define a plurality of lands disposed therebetween. The plurality of lands is substantially free of the hydrophilic coating. Furthermore, a thickness of the hydrophilic coating is substantially constant along a length of the active surface and an edge of the hydrophilic coating adjacent the plurality of lands is substantially continuous. A method for preparing the bipolar plate is also provided.

19 Claims, 2 Drawing Sheets

REMOVAL OF NON-CONDUCTIVE HYDROPHILIC COATINGS FROM LANDS OF FUEL CELL BIPOLAR PLATES

FIELD OF THE INVENTION

The present disclosure relates to fuel cells and more particularly to a method for removing coatings from the lands of fuel cell bipolar plates.

BACKGROUND OF THE INVENTION

Fuel cells have been proposed as a clean, efficient and environmentally responsible power source for electric vehicles and various other applications. In particular, fuel cells have been identified as a potential alternative for the traditional internal-combustion engine used in automobiles.

A typical fuel cell is known as a proton exchange membrane (PEM) fuel cell. The PEM fuel cell typically includes three basic components: a cathode, an anode and an electrolyte membrane. The electrolyte membrane is sandwiched between the cathode and the anode to form a membrane-electrolyte-assembly (MEA). The fuel cell generally also includes porous conductive materials, known as gas diffusion media (GDM), which distribute gaseous reactants over the surfaces of the electrode layers. The reactants typically include a hydrogen fuel and oxygen. The oxygen can be supplied from air, for example. The hydrogen is delivered to the anode and is converted to protons. The protons travel through the electrolyte to the cathode. The electrons in the anode flow through an external circuit to the cathode, where the electrons join the oxygen and the protons to form water. Individual fuel cells can be stacked together in series to form a fuel cell stack capable of supplying a desired amount of electricity.

The MEA is generally interposed between a pair of electrically conductive bipolar plates to complete the PEM fuel cell. The bipolar plates serve as current collectors for the anode and cathode, and have appropriate flow channels and openings formed therein for distributing the fuel cell's gaseous reactants over the surfaces of the respective electrodes. The flow channels generally define lands therebetween that are in electrical contact with the GDM of the fuel cell. Typically, the bipolar plates also include inlet and outlet headers which, when aligned in a fuel cell stack, form internal supply and exhaust manifolds for directing the fuel cell's gaseous reactants and liquid coolant to and from, respectively, the anodes and cathodes.

As is well understood in the art, it is desirable for the membrane within the fuel cell to have a certain relative humidity. The certain relative humidity maintains an ionic resistance within a range effective for conduction of protons across the membrane. During operation of the fuel cell, water from the MEAs and external humidification may enter the anode and cathode flow channels. Typically, the water is forced along the flow channels by a velocity of a gaseous reactant, the velocity of the gaseous reactant being a primary mechanism for water removal from the flow channels. However, if the velocity is not sufficient, water can accumulate resulting in a phenomenon known as stagnation. Stagnant water can block flow channels and reduce the overall efficiency of the fuel cell. For example, the stagnant water may increase flow resistance in particular channels and divert the gaseous reactants to neighboring channels, thereby starving a local area of the reactants. The accumulation of water can also lead to a higher rate of carbon corrosion of the cathode electrode, and a poorer durability under freezing conditions. A high degree of water accumulation or stagnation can lead to fuel cell failure.

Bipolar plates having an increased hydrophilicity are known to positively affect water management in fuel cells. In particular, it is known to treat the anode and cathode flow channels to increase their hydrophilicity. Suitable hydrophilic coatings are known in the art. A thickness of the hydrophilic coating is typically optimized to meet durability and performance requirements for the fuel cell stack. However, it is known that some hydrophilic coatings tend to increase the ohmic contact resistance between the GDM and the bipolar plates. This may lead to a significant loss in stack performance. As a nonlimiting example, a contact resistance of about 20 mohm-cm$^2$ corresponds to a voltage loss of about 30 mV at an operating fuel cell current density of about 1.5 A cm$^{-2}$. For a fuel cell vehicle that is 50% efficient, for example, this voltage drop amounts to 2.5% loss in performance and 5% loss in fuel economy.

It is known to mask the bipolar plates during application of the hydrophilic coating. The masking limits the application of the coatings to the flow channels, leaving the lands exposed for contact with the GDM after the mask is removed. The mask is generally removed by washing, peeling or scraping. Additionally, hydrophilic coatings have previously been removed prior to drying with a hard rubber surface, e.g. a squeegee. It is further known to polish the lands after application of the hydrophilic coating to the bipolar plates. However, each of these methods is generally inefficient. The squeegee method may result in an undesired accumulation of the hydrophilic coating in the flow channels. Processing steps such as washing, peeling, scraping, and polishing the active surface, for example, may lead to an undesired distortion of the bipolar plates and an undesirable durability due to tearing or cracking of the hydrophilic coating at an interface between the lands and the flow channels.

There is a need for a fuel cell system and a method that provides a desired thickness of the hydrophilic coating on the bipolar plates which has no substantial impact on the contact resistance between the bipolar plates and the gas diffusion media. Desirably, the fuel cell system and method militates against carbon corrosion and improve the durability and performance of the fuel cell system.

SUMMARY OF THE INVENTION

In concordance with the instant disclosure, a bipolar plate and a method that militates against carbon corrosion and optimizes the durability of a fuel cell system employing the bipolar plate is surprisingly discovered.

In one embodiment, a bipolar plate for a fuel cell is provided including a plate having an active surface with a plurality of flow channels formed therein. The plurality of flow channels have a hydrophilic coating deposited thereon and define a plurality of lands disposed therebetween. The plurality of lands is free of the hydrophilic coating. Furthermore, a thickness of the hydrophilic coating is substantially constant along a length of the active surface. An edge of the hydrophilic coating adjacent to the plurality of lands is also substantially continuous. A fuel cell employing the bipolar plate is also provided.

In another embodiment, a method for coating a fuel cell bipolar plate is described. The method includes the steps of: providing the bipolar plate having an active surface with a plurality of flow channels formed therein, the plurality of flow channels defining a plurality of lands therebetween; applying a hydrophilic coating to the active surface of the bipolar plate;

absorbing the hydrophilic coating from the plurality of lands with an absorbent body, wherein the hydrophilic coating is substantially removed from the plurality of lands; and finishing the hydrophilic coating disposed in the plurality of flow channels.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

Figure 1:
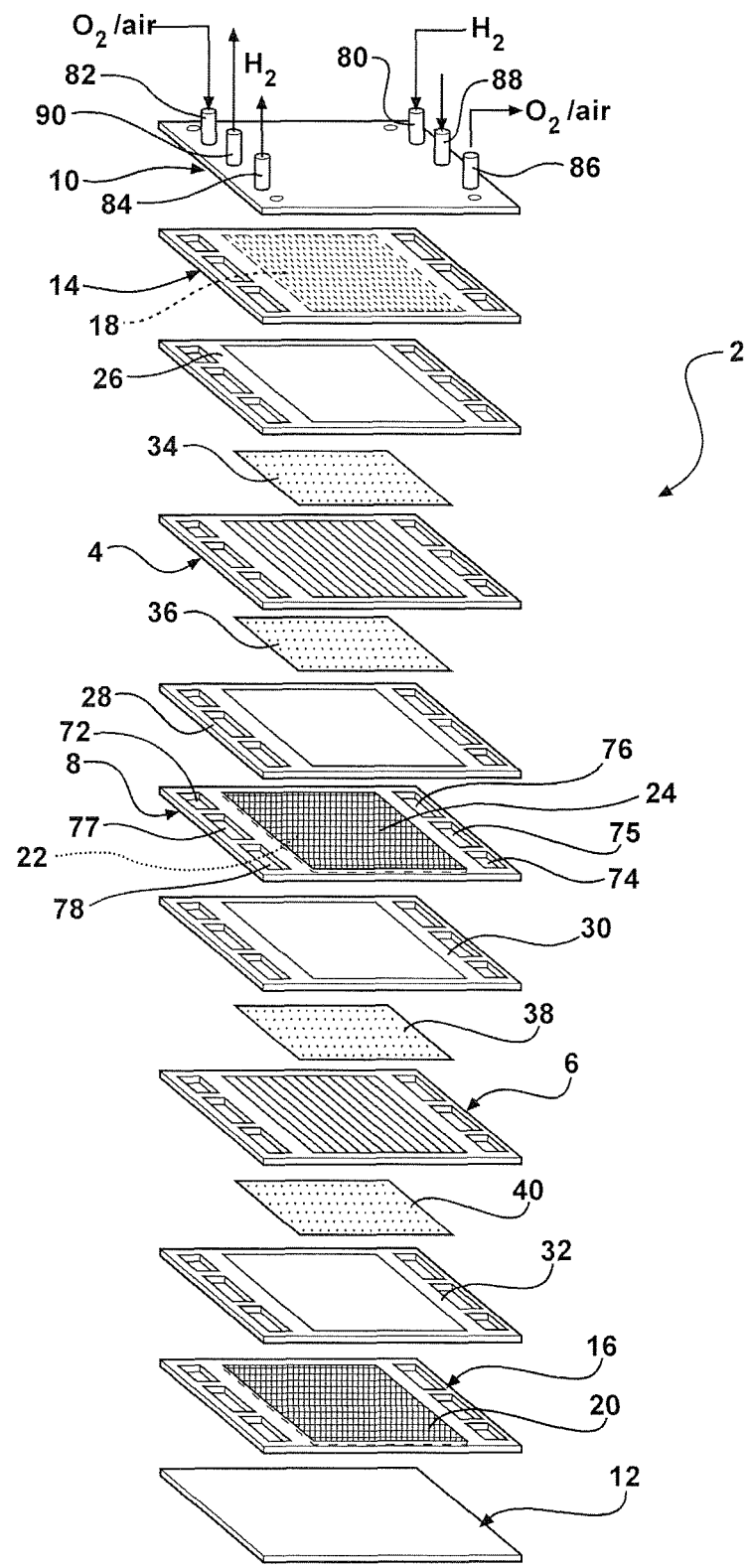
FIG. 1 illustrates a schematic, exploded perspective view of a PEM fuel cell stack (only two cells shown) according to an embodiment of the invention.

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

For simplicity, only a two-cell stack (i.e. one bipolar plate) is illustrated and described in FIG.1, it being understood that a typical fuel cell stack will have many more such cells and bipolar plates.

FIG. 1 depicts a two-cell, bipolar PEM fuel cell stack 2 having a pair of MEAs 4, 6 separated from each other by an electrically conductive bipolar plate 8. The MEAs 4, 6 and bipolar plate 8 are stacked together between a pair of clamping plates 10,12, and a pair of unipolar end plates 14, 16. The clamping plates 10,12 are electrically insulated from the end plates 14, 16 by a gasket or a dielectric coating (not shown). The unipolar end plates 14, 16 and the bipolar plate 8 include active areas 18, 20, 22, 24 for distributing fuel and oxidant gases (i.e., $H_2$ & $O_2$/air) over the faces of the MEAs 4, 6. Nonconductive gaskets 26, 28, 30, 32 provide seals and an electrical insulation between the several components of the fuel cell stack. Porous gas diffusion media 34, 36, 38, 40, e.g. carbon or graphite diffusion papers, abut an anode face and a cathode face of the MEAs 4, 6. The end plates 14, 16 are disposed adjacent to the gas diffusion media 34, 40 respectively, while the bipolar plate 8 is disposed adjacent to the diffusion medium 36 on the anode face of MEA 4. The bipolar plate 8 is further disposed adjacent to the gas diffusion medium 38 on the cathode face of MEA 6.

The two-cell bipolar PEM fuel cell stack 2 further includes a cathode supply manifold 72 and a cathode exhaust manifold 74, a coolant supply manifold 75 and a coolant exhaust manifold 77, and an anode supply manifold 76 and an anode exhaust manifold 78. The supply manifolds 72, 75, 76 and the exhaust manifolds 74, 77, 78 are formed, for example, by a cooperation of apertures formed in the bipolar plate 8 with apertures formed in the gaskets 26, 28, 30, 32 and apertures formed in the end plates 14, 16. A hydrogen gas is supplied as an anode supply stream to the anode supply manifold 76 via an anode inlet conduit 80. An oxidant gas is supplied as a cathode supply stream to the cathode supply manifold 72 of the fuel cell stack 2 via a cathode inlet conduit 82. An anode outlet conduit 84 and a cathode outlet conduit 86 are also provided for the anode exhaust manifold 78 and the cathode exhaust manifold 74, respectively. A coolant inlet conduit 88 and a coolant outlet conduit 90 are provided for supplying liquid coolant to, and removing coolant from, respectively, the coolant inlet manifold 75 and the coolant outlet manifold 77. It should be understood that the configurations of the various inlets 80, 82, 88 and outlets 84, 86, 90 in FIG. 1 are for the purpose of illustration, and other configurations may be chosen as desired.

Figure 2:
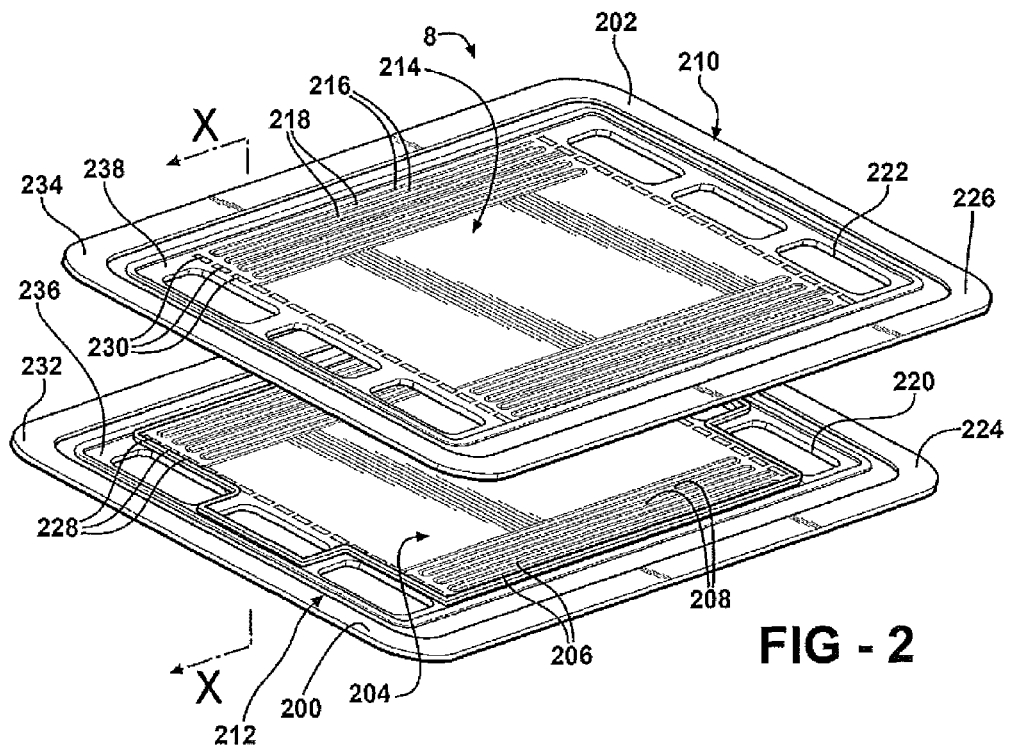
FIG. 2 is an exploded perspective view of an illustrative bipolar plate, assembled from a pair of unipolar plates, for use in the PEM fuel cell stack shown in FIG. 1.

FIG. 2 shows the bipolar plate 8, which includes a first exterior metal sheet or unipolar plate 200 and a second exterior metal sheet or unipolar plate 202. The unipolar plates 200, 202 are typically formed by any conventional process for shaping sheet metal such as, for example, stamping, machining, molding, or photo etching through a photolithographic mask. In one particular embodiment, the unipolar plates 200, 202 are formed by stamping.

It should be recognized that sheet metal is available in a variety of gauges which are suitable for the unipolar plates 200, 202 of the present invention. In particular embodiments, the metal sheets are from about 0.002 inches (about 0.05 mm) to about 0.02 inches (about 0.5 mm) thick. It is understood, however, that sheet metal of other thicknesses can be used as desired. Suitable metals may include, for example, aluminum and high- or low-grade stainless steel. It is further understood that other materials can be used. As a nonlimiting example, the bipolar plate 8 may comprise an electrically conductive non-metallic material, such as a graphite or graphite-filled polymer, for example.

An internal face 204 of the first unipolar plate 200 is shown in FIG. 2. A plurality of coolant channels 206 are formed in the internal face 204, defining therebetween a plurality of ridges 208. An internal face (not shown) of the unipolar plate 202 also includes a plurality of coolant channels (not shown) which define therebetween a plurality of ridges or lands (not shown). The plurality of coolant channels is configured for a coolant to flow therethrough, for example from a first end 210 of the bipolar plate to a second end 212, during the operation of the fuel cell stack 2. It should be understood that the coolant channels in unipolar plates 200, 202 can be configured as desired.

The second unipolar plate 202 has an active surface 214. The active surface 214 is configured to deliver reactant gases to a membrane electrode assembly, for example the MEAs 4, 6. The active surface 214 has a plurality of flow channels 216 formed therein. The plurality of flow channels defines a plurality of lands 218 formed therebetween. The plurality of flow channels 216 formed in the active surface 214 constitute a "flowfield", through which the reactant gases flow. For example, the reactant gases can flow from the first end 210 of the bipolar plate to the second end 212 thereof. When the fuel cell is fully assembled, the lands 218 contact the porous gas diffusion media 36, 38 which, in turn, contact the MEAs 4, 6.

Typically, the lands 218 and the flow channels 216 are formed in the active surface 214 of the unipolar plates 200, 202 that contact the gas diffusion media 36, 38. The flow channels 216 are configured to receive the reactant gas from supply ports 220, 222, for example. The supply ports 220, 222 are formed in an inlet header 224, 226, respectively, and are disposed at the first end 210 of the bipolar plate 8. The flow channels 216 are further configured to exhaust the excess reactant gases and water via exit ports 228, 230, for example. The exit ports 228, 230 are formed in an outlet header 232, 234, respectively, and are disposed at the second end 212 of the bipolar plate.

It should be understood that an active surface (shown in FIG. 3) of the unipolar plate 200 corresponds substantially to the active surface 214 of the unipolar plate 202. For example, like the unipolar plate 202, the active surface of the unipolar plate 200 is formed to provide a plurality of lands (shown in FIG. 3) defined by a plurality of flow channels (shown in FIG. 3). The plurality of lands and the plurality of flow channels constitute a flowfield through which the reactant gases pass. It should be understood that the design of the flowfield on the active surface of the unipolar plate 200 may be substantially similar to the design of the flowfield on the active surface 214 of the unipolar plate 202.

The unipolar plates 200, 202 further have exhaust openings 236, 238 formed, respectively, in the outlet headers 232, 234. The exhaust openings 236, 238 form an exhaust manifold in the aligned and assembled bipolar plate 8 which provides a passage for exhaust reactants and reaction products, for example liquid water and water vapor, to exit the fuel cell stack 2.

Typically, the unipolar plates 200, 202 are bonded together, for example by an adhesive, to form the assembled bipolar plate 8. Bonding may be accomplished, for example, by brazing, diffusion bonding, laser welding, or gluing with a conductive adhesive, as is well known in the art. Suitable binders are known to those of skill in the art and can be chosen as desired.

Figure 3:
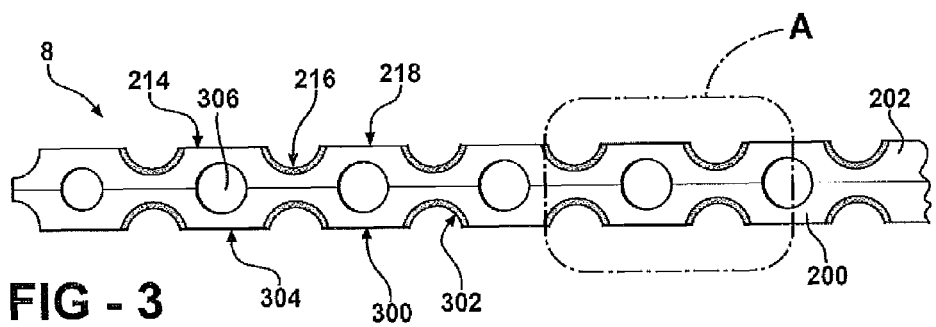
FIG. 3 is a fragmentary cross-sectional view of the assembled bipolar plate taken along section line X-X shown in FIG. 2.
Figure 4:
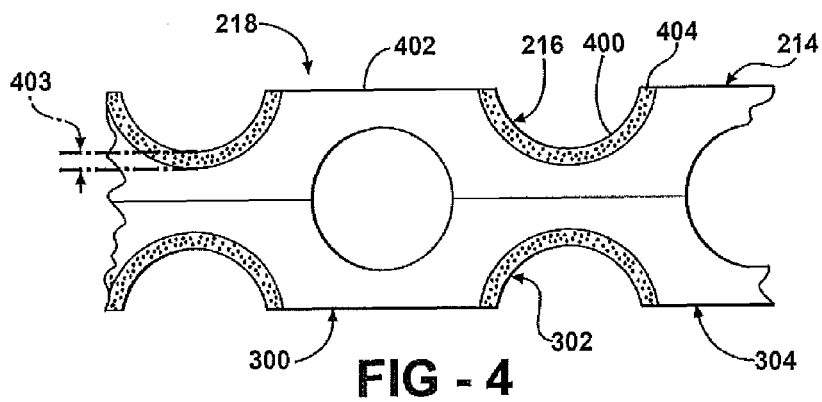
FIG. 4 is an enlarged, fragmentary cross-sectional view of the assembled bipolar plate taken at an area A of the assembled bipolar plate shown in FIG. 3.

With reference to FIGS. 3 and 4, the assembled bipolar plate 8 is shown. The bipolar plate 8 includes the active surface 214 having the plurality of flow channels 216 and the plurality of lands 218 formed therebetween. The bipolar plate 8 further includes a second active surface 300 having a second plurality of flow channels 302 and a second plurality of lands 304 formed therebetween. It should be appreciated that the structure and associated methods relating to the second pluralities of flow channels 302 and lands 304 are substantially the same as the structure and associated methods relating to the pluralities of flow channels 216 and lands 218 described herein. The assembled bipolar plate 8 also includes a plurality of coolant channels 306 formed between the first unipolar plate 200 and the second unipolar plate 202.

As is further shown in FIG. 4, the plurality of flow channels 216 has a coating 400 deposited thereon. The plurality of lands 218 includes a surface 402 substantially free of a coating material. In one embodiment, the coating 400 is hydrophilic. The hydrophilic coating 400 may include inorganic and organic structures. Examples of suitable hydrophilic coatings include, but are not limited to, metal oxides. Suitable metal oxides include, for example, $SiO_2$, $HfO_2$, $ZrO_2$, $Al_2O_3$, $SnO_2$, $Ta_2O_5$, $Nb_2O_5$, $MoO_2$, $IrO_2$, $RuO_2$, metastable oxynitrides, nonstoichiometric metal oxides, oxynitrides, and derivatives thereof, including carbon chains or including carbon-based groups, polar groups, and mixtures thereof.

In a particular embodiment of the present invention, the hydrophilic coating 400 may include hydrophilic nanoparticles such as, for example, x-tec® 4014 or 3408 available from Nano-X, GmbH. Non-limiting examples of suitable hydrophilic coatings 400 including nanoparticles are disclosed in assignee's co-pending U.S. Pat. App. Ser. No. 60/707,705, incorporated herein by reference in its entirety.

As a nonlimiting example, the nanoparticles may have a size ranging from about 2 nanometers to about 100 nanometers; particularly from about 2 nanometers to about 20 nanometers; and most particularly from about 2 nanometers to about 5 nanometers. The nanoparticles may include inorganic materials, organic materials, and combinations thereof. The coating 400 may include an organic compound having a hydroxyl, halide, carboxyl, ketonic, or aldehyde functional groups, and combinations thereof. It should be understood that the coating 400 is applied to make the plurality of flow channels 216 hydrophilic.

In a further embodiment, the hydrophilic coating 400 includes nanoparticles having from about 10 percent to about 90 percent by weight of an inorganic structure, about 5 percent to about 70 percent by weight of a hydrophilic structure, and up to about 50 percent by weight of an organic side chain having a functional group. As a nonlimiting example, the hydrophilic side chains are one of an amino, sulfonate, sulfate, sulfite, sulfonamide, sulfoxide, carboxylate, polyol, polyether, phosphate, phosphonate, and combinations thereof. In an additional embodiment, the coating 400 may include organic side chains, wherein the functional groups of the organic side chains are epoxy, acryloxy, methacryloxy, glycidyloxy, allyl, vinyl, carboxyl, mercapto, hydroxyl, amide or amino, isocyano, hydroxy, silanol, and combinations thereof. The liquid coating 400 may have a pH ranging from about 3 to about 10.

The coating 400 is typically deposited to provide a thickness 403 of greater than about 100 nm. In particular embodiments, the coating 400 has a thickness 403 of greater than about 120 nm. In one particular embodiment the coating 400 has a thickness 403 of about 150 nm. It should be appreciated that other thicknesses 403 may be used, and that a greater thickness 403 provides for an improved durability of the coating 400 with repeated fuel cell operation.

It is desirable for the coating 400 to have a substantially constant thickness 403 along a length of the active surface 214. As a non-limiting example, the thickness 403 at any selected location in the plurality of flow channels 216 is substantially the same as the thickness 403 at any second selected location in the plurality of flow channels 216.

Illustratively, the coating 400 in the plurality of flow channels 216 has an edge 404 disposed adjacent to the plurality of lands 218. The edge 404 of the coating 400 is substantially continuous. As defined herein, the term "continuous" is defined to mean that the edge 404 has substantially no irregularities or fissures. Fissures include, for example, tearing or cracking that typically occurs with a buffing or polishing of the plurality of lands 218 to remove the coating 400 therefrom. It should be appreciated that the presence of fissures at the edge 404 of the coating 400 may affect the durability of the coating 400.

The present invention further includes a method for coating the fuel cell bipolar plate 8 to prepare a coating 400 as described herein. The method includes first providing the bipolar plate 8 having the active surface 214 with a plurality of flow channels 216 formed therein, the plurality of flow channels 216 defining the plurality of lands 218 therebetween. It is understood that the method of the current invention can be used for coating unipolar plates, bipolar plates, and other plates as desired. The hydrophilic coating 400 is applied to the active surface 214 of the bipolar plate 8, including both the plurality of flow channels 216 and the plurality of lands 218. Following the application of the hydrophilic coating 400, the hydrophilic coating 400 is absorbed from the plurality of lands 218 with an absorbent body. The hydrophilic coating 400 is thereby substantially removed from the plurality of lands 218. The hydrophilic coating 400 deposited within the plurality of flow channels 216 is finished, for example, by at least one of drying and curing the hydrophilic coating 400.

In particular embodiments, the hydrophilic coating 400 is applied as a slurry solution including a quantity of hydrophilic nanoparticles and a solvent vehicle. The solvent vehicle may include water, alcohol, and other suitable solvents, for example. In one embodiment, the slurry includes about 4 to about 5 weight percent nanoparticles with the remaining portion being the solvent vehicle.

Suitable slurry materials are commercially available from Nano-X GmbH, for example, under the tradenames x-tec® HP3408 and HP4014. The slurry materials may provide the hydrophilic coating 400. The hydrophilic coating 400 may be permanent, i.e. capable of surviving fuel cell operating condition for more than 2500 hours. In particular embodiments, the coating 400 is capable of surviving fuel cell operation conditions for more than 6000 hours. U.S. Pat. App. No. 2004/0237833, the disclosure of which is hereby incorporated by reference in its entirety, describes a number of ways to make a slurry useful for the present invention. It should be understood that other suitable slurries and coatings may be used as desired.

The application of the hydrophilic coating 400 may include, as nonlimiting examples, spraying, brushing, rolling, printing, dipping, physical vapor deposition, chemical vapor deposition or plasma-assisted vapor deposition. In particular embodiments, the hydrophilic coating 400 is applied by submerging the bipolar plate 8 in a bath including a hydrophilic material such as the slurry with hydrophilic nanoparticles, for example. The bipolar plate 8 is then removed from the bath, whereby the hydrophilic coating 400 is applied to the active surface 214.

In removing the hydrophilic coating 400 from the plurality of lands 218, the absorbent body is applied with a vertical pressure and for a time sufficient to absorb the hydrophilic coating 400 therefrom. In particular embodiments, the absorbent body is repeatedly applied and removed in order to ensure that substantially all of the hydrophilic coating 400 is removed from the lands 218.

One of ordinary skill should understand that any material capable of absorbing the unfinished hydrophilic coating 400 described herein is sufficient for use in the method of the invention. Illustratively, the absorbent body may be carbon paper such as, for example, TGPH-060, a carbon paper commercially available from the Toray Company. In one particular embodiment the absorbent body is a non-woven polyester material such as, for example, Exsorbx 400, a polyester wipe commercially available from the Berkshire Corporation. It should be appreciated that other absorbent materials may be used as desired.

It should be further understood that a thickness and a stiffness of the material should be sufficient to militate against a contacting of the material with the plurality of flow channels 216. To provide a sufficient stiffness to the absorbent material, the absorbent material may be affixed to a rigid block of material. As a nonlimiting example, the absorbent material may be the non-woven polyester cloth that is stapled to a stiff Styrofoam block and is then used to absorb the hydrophilic coating 400 from the lands 218.

The vertical pressure with which the absorbent material is applied to the plurality of lands 218 is selected so that the pressure of the absorbent material does not distort the bipolar plate 8. In an illustrative embodiment, the absorbent body is applied at a pressure less than about 25 psi. In a further embodiment, the absorbent body is applied to the plurality of lands 218 at a pressure less than about 10 psi. In a particular embodiment the vertical pressure is less than about 1 psi. It should be appreciated that alternative vertical pressures may be selected as desired.

The absorbent body of the present invention may further be cleaned after the hydrophilic coating 400 is absorbed from the plurality of lands 218. The absorbent body may be repeatedly used, e.g., at least about 10 times, to remove the hydrophilic coating 400 from the plurality of lands 218 before being cleaned. In particular embodiments, the absorbent body is cleaned after each absorption cycle.

The steps of applying the hydrophilic coating 400 to the active surface 214 and absorbing the hydrophilic coating from the plurality of lands 218 may be repeated as desired to provide the hydrophilic coating 400 having the desired thickness 403.

The finishing of the hydrophilic coating 400 can include at least one of drying and curing the wet hydrophilic coating 400. In one embodiment, the hydrophilic coating 400 includes the hydrophilic nanoparticles and the solvent vehicle. After application of the hydrophilic coating as described herein, the solvent vehicle may be driven off, for example, at a temperature from about 80° C. to about 180° C. The curing period may range from about 10 minutes at about 80° C. to about 10 seconds at about 180° C., for example, depending on the particular material and thickness 403 of the coating 400. In a particular embodiment, the curing includes heating the hydrophilic coating to about 150° C. for about 10 minutes. It should be appreciated that other drying conditions and curing conditions may be used as desired.

EXAMPLE

As can be observed in Table I, contact resistance measurements were obtained on samples coated with a hydrophilic coating and treated using the method described herein.

The Control and Example samples were flat, 316L stainless steel, 1"×1" coupons having a coating consisting of 99.99% pure gold from Tanury Industries. Both the Control and Example coupons had a contact angle of less than 10 degrees. The contact angle is a measure of hydrophilicity, with an effective contact angle of 0 degrees being the most hydrophilic. The Control coupons had a hydrophilic Nano-X coating applied at a thickness of about 100 nm and, when finished, simulated a bipolar plate having a plurality of lands with the hydrophilic coating applied.

In contrast, the Example coupons, following the application of the Nano-X coating, were compressed between two carbon paper pads at a pressure of about 25 psi. The carbon paper pads absorbed the Nano-X from the surfaces of the Example coupons. The Example coupons had a shiny surface, indicating the absence of the Nano-X coating on the surface.

TABLE I

| Coupon Contact Pressure (psi) | Control $P_t/P_b$ (mOhm-cm$^2$) | Example $P_t/P_b$ (mOhm-cm$^2$) |
| --- | --- | --- |
| 50 | 219 | 19 |
| 100 | 127 | 12 |
| 150 | 85 | 10 |
| 200 | 63 | 9 |
| 250 | 51 | 7 |

In obtaining the contact resistance measurements, the Example coupons were compressed together between two diffusion media papers (designated as "$P_t$" for the top paper and as "$P_b$" for the bottom paper) at pressures from between 50 and 250 psi (about 350 to about 1725 kPa). At these pressures, a 1 A/cm$^2$ current density was applied. Contact resistance measurements were obtained from the voltage drop between the diffusion media ($P_t/P_b$) sandwiching the two metal coupons. At an applied pressure of 50 psi (about 350 kPa) the Control coupons exhibited a contact resistance value of 254 mOhm-cm². At an applied pressure of 200 psi (about 1400 kpa), the Control coupons exhibited a contact resistance value of about 63 mOhm-cm². In comparison, the Example coupons prepared according to the described method exhibited a contact resistance of only 19 mOhm-cm² at an applied pressure of 50 psi (about 350 kPa) and a contact resistance of 9 mOhm-cm² when 200 psi (about 1400 kpa) was applied. Thus, it should be appreciated that the removal of the hydrophilic coating 400 from the plurality of lands 218 optimizes contact resistance between the gas diffusion media 36, 38 and the bipolar plate 8 prepared according to the method of the invention.

A skilled artisan should appreciate that the method of the present invention, providing the bipolar plate 8 having the hydrophilic coating 400 in the plurality of flow channels 216, and the plurality of lands 218 being substantially free of the hydrophilic coating 400, provides for greater fuel cell durability and performance, optimized resistance to carbon corrosion, and optimized contact resistance.

It should further be understood that the method described herein provides the bipolar plate 8 with the consistent thickness 403 of the coating 400 in the flow channels 216. Such a thickness is different than the coating thickness that occurs when the plurality of lands 218 are cleaned by squeegee to remove the coating 400 therefrom. Such a process may result in an irregular or non-consistent accumulation of the coating 400 in the flow channels 216.

It also be understood that the method described herein provides the bipolar plate 8 having substantially no fissures included, for example, tearing or cracking that typically occurs with a buffing or polishing of the plurality of lands 218. It is known that such fissures also occur with removal of a masking, which typically requires similar buffing, polishing or cleaning to remove the masking after application of the coating 400. The absence of fissures at the edge 404 of the coating 400 optimizes the durability of the coating 400. The absence of a polishing or buffing step further provides for little to no plate distortion using the method of the present invention.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for coating a fuel cell bipolar plate, the method comprising the steps of:
   providing the bipolar plate having an active surface with a plurality of flow channels formed therein, the plurality of flow channels defining a plurality of lands therebetween;
   applying a hydrophilic coating to the active surface of the bipolar plate;
   absorbing the hydrophilic coating from the plurality of lands, wherein the step of absorbing the hydrophilic coating includes compressing the bipolar plate between a pair of absorbent bodies, one of the absorbent bodies pressing against the hydrophilic coating on the plurality of lands with only a vertical pressure and without contacting the plurality of flow channels to absorb the hydrophilic coating from the plurality of lands and militate against an irregular or non-consistent accumulation of the hydrophilic coating in the plurality of flow channels; and
   finishing the hydrophilic coating disposed in the plurality of flow channels.

2. The method of claim 1, wherein the hydrophilic coating includes a slurry solution including a quantity of hydrophilic nanoparticles and a solvent.

3. The method of claim 1, wherein the applying the hydrophilic coating includes submerging the bipolar plate in a bath including a hydrophilic material.

4. The method of claim 3, wherein the applying the hydrophilic coating further includes removing the bipolar plate from the bath including the hydrophilic material, wherein the hydrophilic coating is applied to the active surface.

5. The method of claim 1, wherein the applying the hydrophilic coating includes a spraying of the hydrophilic coating onto the active surface.

6. The method of claim 1, wherein the vertical pressure is applied for a time sufficient to absorb the hydrophilic coating from the plurality of lands.

7. The method of claim 6, wherein the vertical pressure is less than about 25 psi.

8. The method of claim 6, wherein the absorbent body includes a carbon paper.

9. The method of claim 6, wherein the absorbent body includes a non-woven polyester material.

10. The method of claim 6, further comprising the step of cleaning the absorbent body after the hydrophilic coating is absorbed.

11. The method of claim 10, wherein the absorbent body is cleaned after absorbing the hydrophilic coating from the plurality of lands at least 10 times.

12. The method of claim 1, wherein the steps of applying the hydrophilic coating to the active surface and absorbing the hydrophilic coating from the plurality of lands are repeated to provide a hydrophilic coating in the plurality of flow channels having a desired thickness.

13. The method of claim 1, wherein the finishing of the hydrophilic coating includes a drying of the hydrophilic coating.

14. The method of claim 1, wherein the finishing of the hydrophilic coating includes a curing of the hydrophilic coating.

15. The method of claim 14, wherein the curing includes heating the hydrophilic coating to about 150° C. for about 10 minutes.

16. The method of claim 1, wherein at least one of a thickness and a stiffness of each of the absorbent bodies is sufficient to militate against a contacting of the one of the absorbent bodies with the plurality of flow channels.

17. A method for coating a fuel cell bipolar plate, the method comprising the steps of:
   providing the bipolar plate having an active surface with a plurality of flow channels formed therein, the plurality of flow channels defining a plurality of lands therebetween;
   applying a hydrophilic coating to the active surface of the bipolar plate;
   absorbing the hydrophilic coating from the plurality of lands, wherein the step of absorbing the hydrophilic coating includes compressing the bipolar plate between a pair of absorbent bodies, one of the absorbent bodies pressing against the hydrophilic coating on the plurality of lands with a unidirectional pressure orthogonal to the active surface and without contacting the plurality of flow channels to absorb the hydrophilic coating from the plurality of lands and militate against an irregular or non-consistent accumulation of the hydrophilic coating in the plurality of flow channels; and finishing the hydrophilic coating disposed in the plurality of flow channels.

18. A method for coating a fuel cell bipolar plate, the method comprising the steps of:

provrding the bipolar plate having a first active surface with a first plurality of flow channels formed therein, the first plurality of flow channels defining a first plurality of lands therebetween, and a second active surface with a second plurality of flow channels formed therein, the second plurality of flow channels defining a second plurality of lands therebetween;

applying a hydrophilic coating to the first active surface and the second active surface of the bipolar plate;

absorbing the hydrophilic coating from the first plurality of lands and the second plurality of lands, wherein the step of absorbing the hydrophilic coating includes compressing the bipolar plate between a pair of absorbent bodies, one of the absorbent bodies pressing against the hydrophilic coating on the first plurality of lands with only a vertical pressure and without contacting the first plurality of flow channels to absorb the hydrophilic coating from the first plurality of lands and militate against an irregular or non-consistent accumulation of the hydrophilic coating in the first plurality of flow channels, another of the absorbent bodies pressing against the hydrophilic coating on the second plurality of lands with only a vertical pressure and without contacting the second plurality of flow channels to absorb the hydrophilic coating from the second plurality of lands and militate against an irregular or non-consistent accumulation of the hydrophilic coating in the second plurality of flow channels, wherein at least one of a thickness and a stiffness of each of the absorbent bodies is sufficient to militate against a contacting of the absorbent bodies with the first plurality of flow channels and the second plurality of flow channels; and finishing the hydrophilic coating disposed in the first plurality of flow channels and the second plurality of flow channels.

19. A method for coating a fuel cell bipolar plate, the method comprising the steps of:

providing the bipolar plate having a first active surface with a first plurality of flow channels formed therein, the first plurality of flow channels defining a first plurality of lands therebetween, and a second active surface with a second plurality of flow channels formed therein, the second plurality of flow channels defining a second plurality of lands therebetween;

applying a hydrophilic coating to the first active surface and the second active surface of the bipolar plate;

absorbing the hydrophilic coating from the first plurality of lands and the second plurality of lands, wherein the step of absorbing the hydrophilic coating includes compressing the bipolar plate between a pair of absorbent bodies, one of the absorbent bodies pressing against the hydrophilic coating on the first plurality of lands with a unidirectional pressure orthogonal to the first active surface and without contacting the first plurality of flow channels to absorb the hydrophilic coating from the first plurality of lands and militate against an irregular or non-consistent accumulation of the hydrophilic coating in the first plurality of flow channels, another of the absorbent bodies pressing against the hydrophilic coating on the second plurality of lands with a unidirectional pressure orthogonal to the second active surface and without contacting the second plurality of flow channels to absorb the hydrophilic coating from the second plurality of lands and militate against an irregular or non-consistent accumulation of the hydrophilic coating in the second plurality of flow channels, wherein at least one of a thickness and a stiffness of each of the absorbent bodies is sufficient to militate against a contacting of the absorbent bodies with the first plurality of flow channels and the second plurality of flow channels; and finishing the hydrophilic coating disposed in the first plurality of flow channels and the second plurality of flow channels.

* * * * *